June 16, 1959   F. G. LAMB   2,890,573
UPRIGHT REFRIGERATOR SHOWCASE
Filed July 5, 1956   3 Sheets-Sheet 2
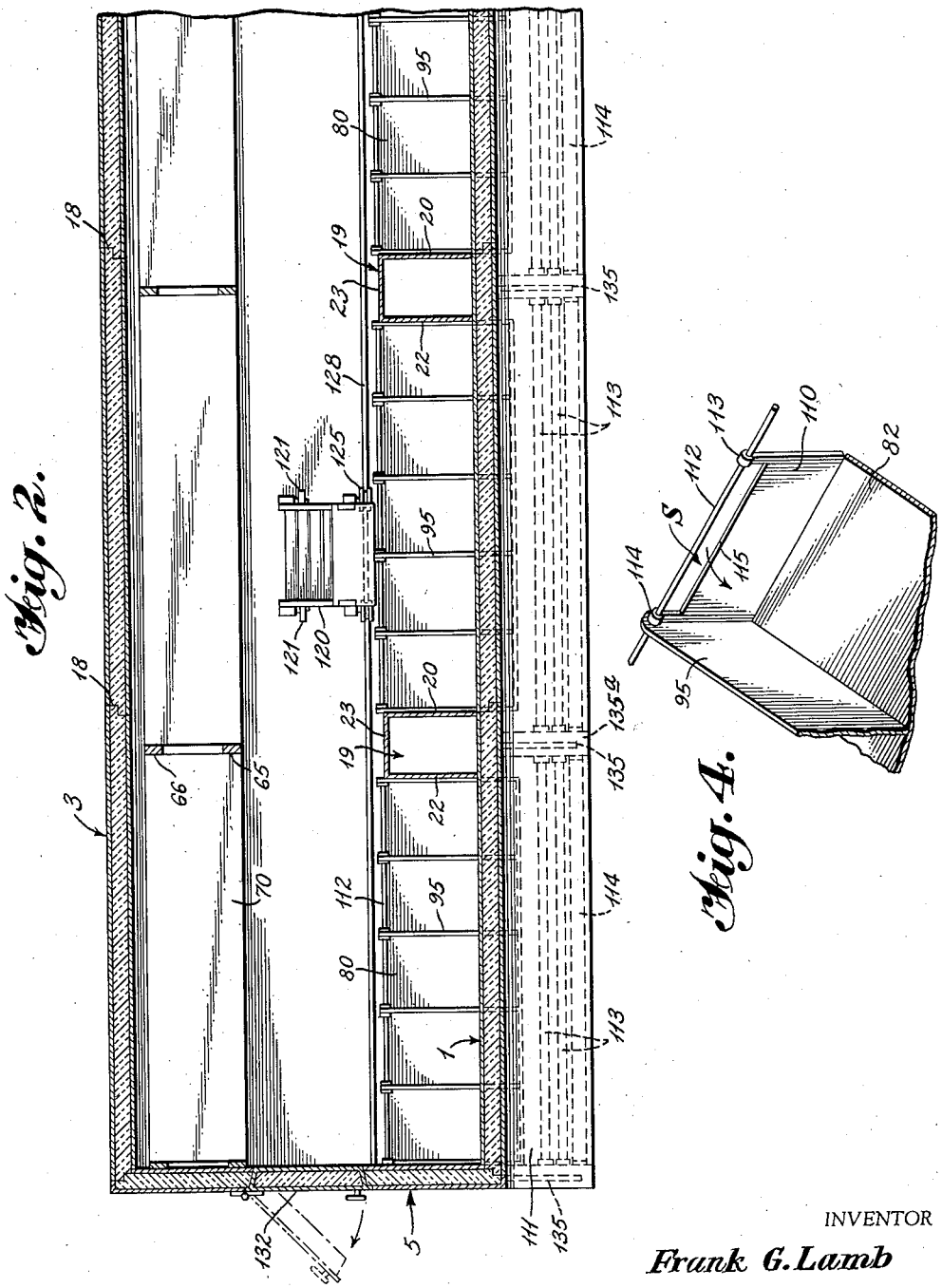
INVENTOR
*Frank G. Lamb*
BY *Thomas, Weisman & Russell*
ATTORNEYS

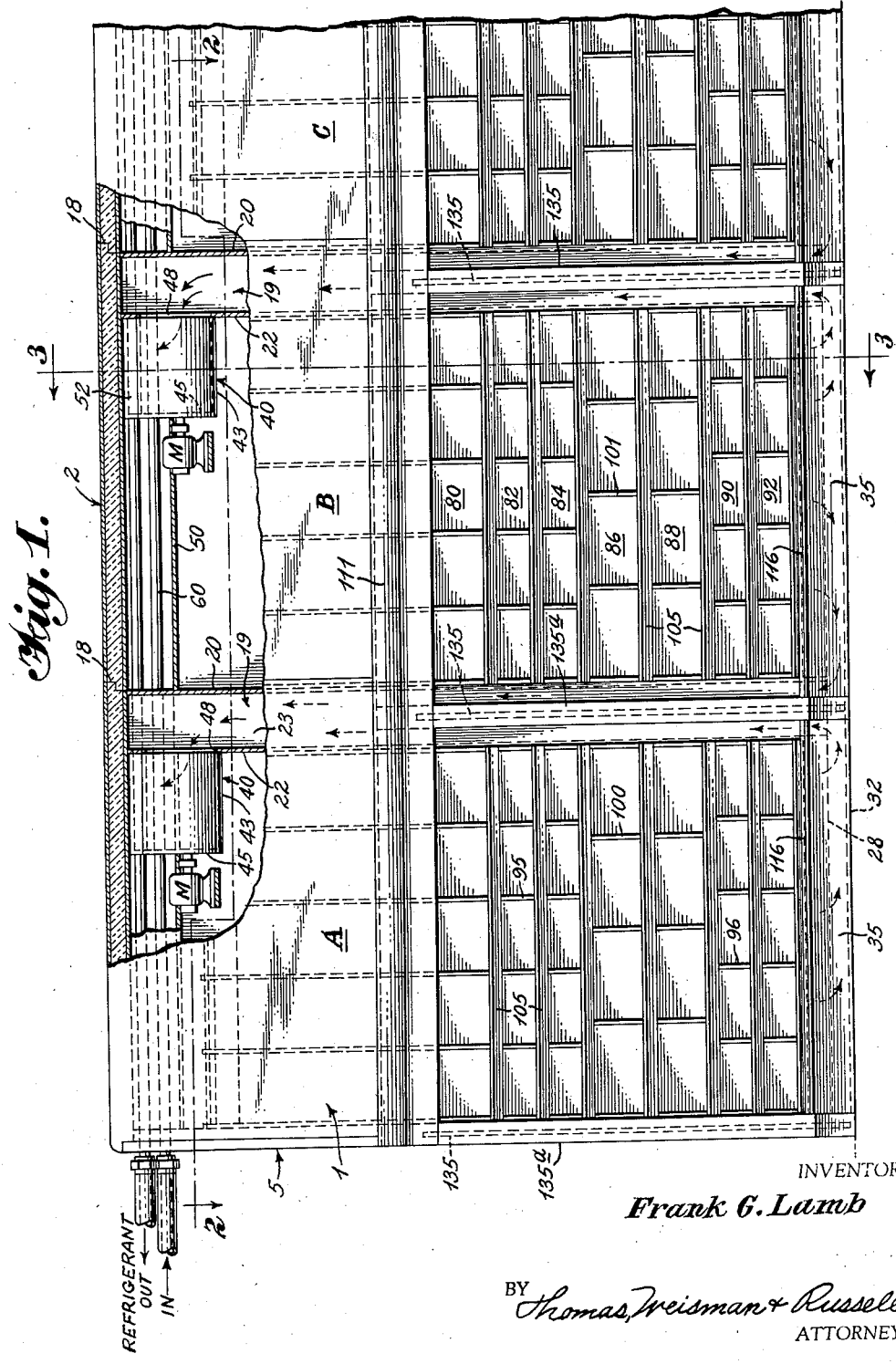

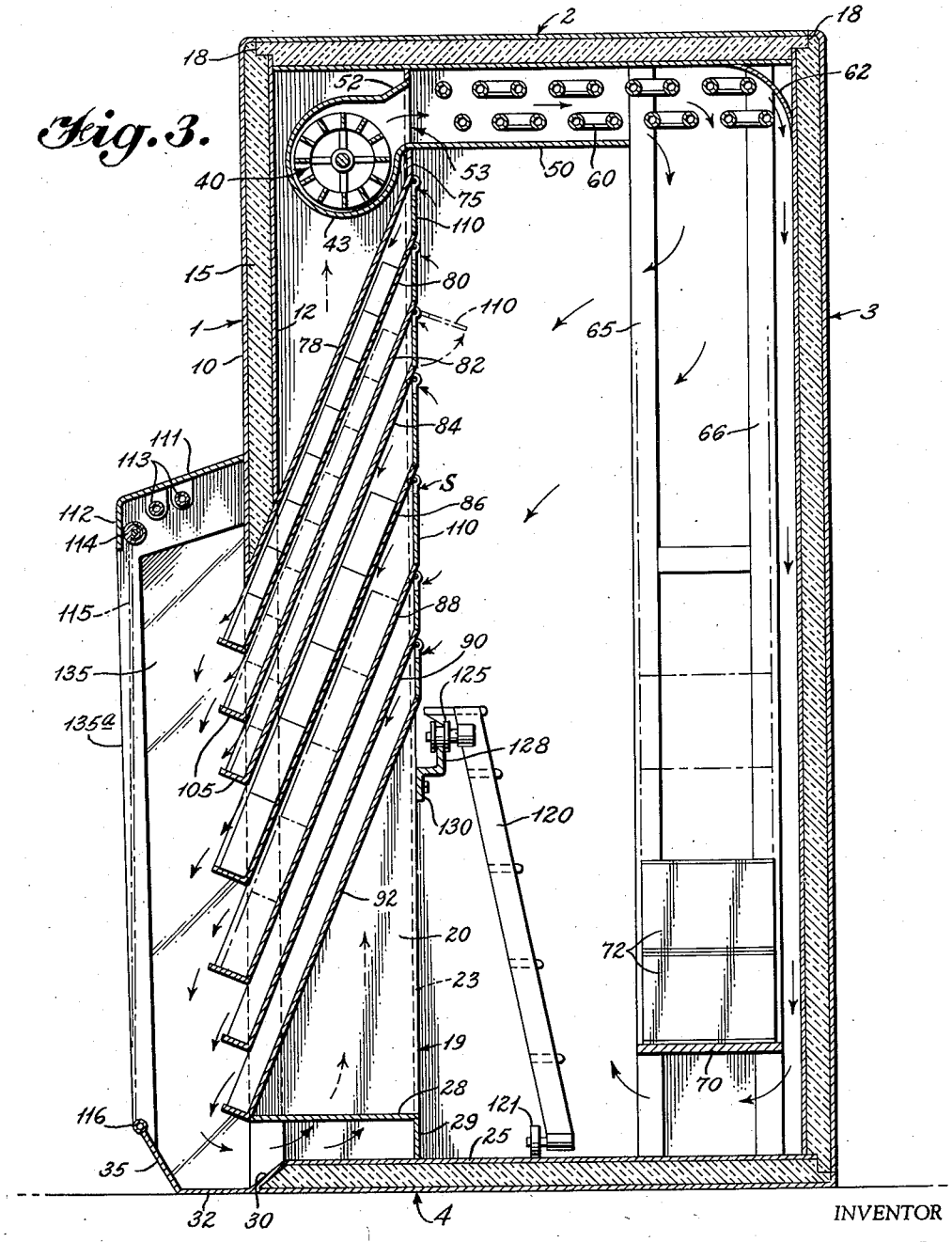

United States Patent Office 2,890,573
Patented June 16, 1959

2,890,573

UPRIGHT REFRIGERATOR SHOWCASE

Frank G. Lamb, Milton-Freewater, Oreg.

Application July 5, 1956, Serial No. 595,972

7 Claims. (Cl. 62—256)

This invention relates to a refrigerated showcase for the display and dispensing of frozen food packages. In more particular, the invention involves an upright refrigerated showcase which exhibits certain unique advantages over similar types of devices in that it presents packaged frozen food more attractively for retail customers and in that it permits control of an even temperature throughout the cabinet and the dispensing trays thereof. The invention thereby avoids the problems common to frozen food dispensers in general use wherein a decided temperature differential necessarily exists throughout the cabinet.

The open, horizontal type of refrigerated cabinet is in common use; in general, it is a box-like structure, having a completely open top, and with the frozen packages placed at random within the box, stacked one upon the other and cooled by appropriate coils generally located at the bottom of the structure but sometimes surrounding most of the interior of the container. These known structures, primarily commercially used in grocery stores, do not display packaged frozen foods advantageously and have no means for evenly controlling the temperature throughout the entire container. This gives rise to severe problems of storage, particularly from the viewpoint of food preservation. Such difficulties will be briefly referred to in the following.

For example, often a substantial portion of such general type of refrigerated cabinet is comprised of glass, necessarily so in order that the frozen packages can be readily viewed and removed by the customer. Using relatively low temperatures within the container, frosting of such glass is quite common. This factor not only lends opaqueness to the glass but the temperature differential which exists at the top of such containers between the cold air and the contacting warm air of the room causes visible and constant frosting of the showcase contents. The result is that individual packages on the top of those within the container become frosted to the extreme, stick together and make handling difficult. With variations of the temperature of the air, particularly at the top portions of such containers, sufficient melting of the contents of the packages with subsequent freezing thereof transforms the foods so exposed to practically a solid block of ice, much more difficult to handle and properly cook.

Of even greater significance is the inability of this type of frozen food container to adequately preserve the foods stored therein over extended periods of time. Because of periodic low temperature ranges, due to the aforesaid temperature differential which necessarily must exist in this known type of cabinet, spoilage often occurs. Since the upper portion thereof is open to the atmosphere, no matter how low the temperature adjacent the refrigerating coils becomes, a decided temperature rise occurs in the upper portion of the structure and the frozen packages on top are thus of a temperature substantially higher than that necessary for preservation of most foods. Common experience has shown that many frozen foods must be kept at a temperature of at least 10° below zero. If the temperature rises above this level to as much as 20° and stays there for any appreciable length of time, the foods will sufficiently deteriorate over a relatively short time such as to render them unfit for consumption. It is impossible to maintain a uniform and even temperature throughout a cabinet of this type even with artificial circulation of the cold air created therein, all because of necessary contact between the upper layer of relatively cold air in the cabinet and the warmer atmosphere of the room.

In contrast, in the present invention, the circulation of air is visualized as being metered out between each layer of frozen food so as to thereby uniformly and effectively cool each layer with air that is maintained at a constant, thermostatically controlled, low temperature. In present types of cabinets, circulation is largely confined to blowing some cold air from inside the walls of the cabinet and from the top of one side of the cabinet over the top of the products; this is sucked into the wall of the cabinet on the opposite side thereof. Thus, in such instances, the air is traveling on largely a horizontal rather than a vertical plane, circulation thereof being over the top of the package instead of, as here, in between each layer of packages. Hence, the upper side of the packages is cooled much more than the packages next to the suction side. It is thus to be observed that in the mechanism and method of the instant invention, each layer of packaged food product is supplied with a metered amount of cold air, the coldest series of cartons of air always being next to the individual packaged product.

Such open top display stands exhibit other disadvantages in use which make them inefficient for sales purposes. The storage problem is one of these. Since all frozen packages are placed within the container at random, the resulting display is unattractive to the prospective retail customer and the merchandise is usually placed at inconvenient heights and distances from the customer. Of necessity, only those on top are generally handled by the customer; if spoilage does occur or a change in the type of articles dispensed is desired, the entire container must be unloaded. Similarly, additional supplies of frozen foods are generally placed on top of those already within the unit, with the underneath packages remaining in place for an undue length of time. Furthermore, it is impractical to utilize such units as receptacles for storage of other packages to replace those that are being constantly removed.

The unit of my invention presents practical solutions to the drawbacks of known devices mentioned in the foregoing. Primary among these is the displaying of packaged frozen foods, attractively and at convenient proximity to the retail shopper with such frozen packaged foods, while the articles being so displayed are protected against damage and deterioration by a continuously descending curtain of cold air. In my invention, an even, uniform temperature is maintained throughout not only the entire interior of the cabinet but also around each of the individual packaged units without undue loss of cold air by extensive contact with air of room temperature. The referred to metered, curtain of very cold air constantly falls toward the floor because of the force of gravity inasmuch as the cold air is denser and thus heavier than the warm air in the room. This cold air falls downwardly at the front of the uprightly displayed products, thus eliminating the necessity of any glass window construction. Furthermore, most of such air, after it has descended to the floor, in the use of the present apparatus, is reclaimed by suction pressure created by the mechanism which induces a current or flow of air that has been mixed with an additional quantity of somewhat warmer air, the latter being recirculated and thus recooled. Thus, a small quantity of cold air is metered out at the top of each layer of vertically displayed frozen food, so that each layer thereof is curtained off from the room temperature by this small quantity of constantly replenished, very cold air falling in front of the unit.

Accordingly, the primary objective of this invention is to utilize a descending curtain of refrigerated air to protect displayed packages of frozen foods for retail sales. This means of protecting packaged food from contact with air of room temperature, employing the means herein described, makes possible the use of an upright display cabinet instead of the conventional open-top cold storage box.

It is a further objective of this invention to provide a refrigerated unit in the form of a showcase adapted to retain and dispense frozen packaged foods and which maintains each of such packages at a uniform and standard temperature such that the possibility of spoilage thereof is obviated, rendering the cabinet much more efficient and practical for use in the distribution of such foods to the public.

Another object of the invention is the provision of a cabinet of the type described which not only provides space for storage of a substantial amount of frozen foods, but which can be easily loaded by direct transfer of the packaged articles from the storage compartment within the cabinet to the rear of the display compartments. It is well known that present showcases of the type herein referred to are comparatively wasteful of floor space. The mechanism of the instant invention permits a display of frozen foods which greatly exceeds the present capacity of showcases, measured per lineal foot thereof. The instant unit is adapted to store five or six times as many cubic feet of frozen foods per square foot of floor area as do frozen food showcases presently in use.

An additional object of the invention is the proivison of a display cabinet which can be made as a single unit but, if desired, which can be employed together in multiple units by simple means without severe alteration of those structural features which are conducive to the maintenance of even, predetermined low temperatures throughout the unit.

A further objective of the invention is the provision of a unit of the described type which, because of its peculiar characteristics involving, inter alia, forced air circulation and a slanted tray or shelf type of dispensing means, eliminates any problem of frosting either of any portions thereof which may be made of glass or of the individual, packaged, frozen items. Pertinent to this aspect of the invention, it should be observed that because my improved apparatus assures evenness of temperature due to complete and thorough thermostatically controlled cold air circulation within the cabinet structure, the cold air therein is rather completely dehydrated. Furthermore, the lowered temperature is maintained throughout without fluctuation, thus preventing absorption of moisture in the air. This being the case, there is far less possibility of the excessive frosting which ordinarily occurs in the open-top type of display box. The latter, being completely open to the atmosphere at room temperature, naturally tends to create a frost problem, especially where such room air is always of relatively high humidity.

It is another object of the invention to provide a unit of the described type which is not only more efficient in operation, particularly with respect to the maintenance of uniform temperature throughout, but which, when taking into consideration the amount of floor space that is saved, is far less expensive than the normal type of cabinet. Furthermore, the construction of the unit is efficient in the further sense of more easily serving the customers who need not bend over to determine the contents of the display side of the cabinet but can easily read the labels of those in position for removal while standing.

Reference will now be made to the several drawings for a more detailed description of the invention, such drawings disclosing a preferred embodiment of my invention. In these drawings:

Figure 1 is a front elevation view, partially in section, of several of the cabinet structures comprising the invention joined together so as to form a single unit;

Figure 2 is a top plan view of the invention taken on the line 2—2 of Figure 1;

Figure 3 is a section view taken on the line 3—3 of Figure 1; and

Figure 4 is a perspective, enlarged view of the rear portion of one of the trays, illustrating the pivoted flap means.

Referring more particularly to these figures, it will be appreciated that the wall structure of the cabinet is of usual form, having front, top, back, bottom and side walls generally indicated by the numerals 1, 2, 3, 4, and 5, respectively. Because of the type of refrigeration structure which is here involved, an adjacent inner wall 12 provides space for the usual type of refrigeration insulation 15.

Use of the invention in multiple units has been briefly mentioned in the foregoing. Any manner of interconnection of two or more of the cabinets can be employed. As a simplified illustration of such, reference is made to the step-type of joint 18 which is disclosed in Figures 1 to 3. Having particular reference to Figure 1, it will be appreciated that when more than one of these units is used, removal of the side wall of, for example, unit A will permit interconnection by means of this step type of joint to unit B, the latter having both of its side walls removed. This can continue with additional units being added in the same manner as, for example, unit C, also being interconnected through the same type of joint 18 to unit B.

Among the unique features of this invention is the essential concept of circulation of cooled air from the front of the display trays back into the interior of the unit to be discharged over the several cooling lines and thence to the storage compartment and dispensing trays. This circulation is in part dependent upon a flue, generally indicated at 19, located upon one side of an individual cabinet. Where several units are used together, such flues 19 are spaced in the manner indicated in Figure 1. This flue, or flues as the case may be, is made-up of two side walls 20 and 22 and closed by a back wall 23, the bottom of the flue, having reference to Figure 3, being the bottom 25 of the cabinet itself. These flues extend not only vertically, as shown in Figure 1, but are also positioned laterally across the bottom portion of the cabinet, the vertical and lateral flues being, of course, interconnected. With respect to the lateral portions of the flues, each is bounded by a top 28 and back 29, the front being open as shown in Figure 3. The top 28, as shown in this figure, may be directly contiguous with the carton retaining flange of the bottom-most of the several trays. The bottom 25 of each of the flues is downwardly deflected, as at 30, this also forming a portion of the cabinet structure itself, the portion 30 extending into a flat, horizontal part 32 coincident with the base 4 and terminating in an upwardly extending flange 35. This flange and the related structure just referred to actually forms a trough adapted to receive the relatively small amount of cool air from the several display trays as it leaks out between them. This cool air is then discharged back into the unit through the several base flues, up vertically through flues 18 and back to the cooling coils within the cabinet.

Propulsion of the air within the cabinet, including that air which has been warmed by some contact with air at room temperature, is obtained by a blower, generally indicated at 40. As shown here, it is of the rotary type and may be of any known design such as to effectively maintain a consistent and uniform circulation of air throughout the entire cabinet and over the tops of the frozen food receiving trays or shelves, to be later described.

This blower is covered by a circular housing 43, a suitable motor M being mounted adjacent the blower for its operation. The housing 43 terminates at its upper side in a portion 52 that is secured to the inner side of the top wall 2 through plate 75, and the lower portion of the housing, as here shown, extends into a horizontal platform or base 50. Referring to Figure 1, it is seen that the housing 43 does not extend across the entire width of the cabinet. Hence, the rest of the area underneath the several refrigeration pipes is broken off by a plate 55 which may be coincident with, or in the same plane as, the referred to plate 50.

The construction just referred to provides a form of housing for a portion of the refrigerating coils 60. For example, these are blocked off near the front of the cabinet by plate 75 and partly, and underneath them, by the referred to plate 50. The latter extends a substantial distance rearwardly and, as herein disclosed in Figure 3, terminates at or adjacent to the upright 65, to be later referred to. The air is thus forced into contact with the cooling pipes 60 and thence downwardly, a curved portion 62 aiding in the directional flow of the current of cold air after it has been cooled. Passage of the air is consequently forced downwardly and also towards the front of the cabinet where it passes over and between the frozen food packages located on the series of slanted trays or shelves.

Where several units are used together, the refrigerating pipes 60 can be mounted after placement and securing of such units adjacent each other, as shown in Figure 1; or, of course, if a single cabinet is used, the pipes can be coiled and positioned accordingly. At any rate, these lines 60 carry the coolant of a refrigeration system of any known type, as for example, a brine system. Here, only the direction of flow of the refrigerant, obtained from an external source, is indicated in the drawings.

In Figure 1, it is seen by reference to the directional arrows that the downward flow of air towards the back of air cooled to a very low temperature passes in some part along the back wall of the unit and through and over stored packages of frozen items. In this embodiment of the invention, the storage compartment consists merely of a series of vertical uprights 65 and 66, extending from floor to top of the cabinet and having intermittently spaced thereon a series of shelves such as that indicated at 70 upon which the larger cartons 72 of the frozen goods can be placed.

Reference will now be made to an additional, unique feature of this invention, namely, the arrangement of elements by which the several packages of frozen foods are charged to a series of slanted trays in a position to slide forwardly by gravity as the individual units in front are removed. As here disclosed, there are seven such trays surmounted by a top plate 78 which is angularly inclined to the vertical and extends downwardly from the vertical wall portion 75 to and through the front wall 1 of the cabinet structure, as shown in Figure 3.

All of the succeeding trays underneath this top portion 78 are parallel therewith and these are separately identified in this figure by the numerals 80, 82, 84, 86, 88, 90 and 92, respectively.

In the preferred embodiment of the invention, the spacing between the trays may vary somewhat in order that packages of different sizes may be received. Thus, for example, the distance between the bottom 80 of the first tray and the bottom 82 of the second tray is less than the distance between the bottom 86 of the fourth tray and that of the fifth tray 88.

Also, a series of compartments are formed in the several shelves or trays by a number of partitions. Referring to Figure 1, these partitions may also differ in size to accommodate different sizes of packaged foods, the partitions 95 and 96, for example, segmenting the trays into smaller units than the partitions 100 and 101.

Each of the several trays is provided at its lower end with a flange 105, positioned right-angularly to the respective base of the tray. It is obvious that the flanges 105 support the whole series of packages which may be charged into a given tray, but permit easy removal of the last unit in each tray.

It is further apparent that, once the several trays are completely filled with packaged items, removal of one from a tray automatically causes the succeeding ones upon that shelf to descend that much lower, the last in line being, in turn, positioned against the respective flange 105 of that tray.

Each of these trays are partially sealed off at their respective upper ends by a pivoted flap 110, here shown as being made of metal. Referring to Figure 4, it is seen that the flaps are suspended from a transverse rod 112 which is affixed in any suitable manner across the top of each of the respective trays. As here illustrated, each flap, upon its outer edges, is fabricated with arms 114 which, at the extremities thereof, are turned upon themselves to form a bore for the reception of this rod 112. Also, each of the flaps, between the arms 114, is of reduced dimension, the edge 115 thus being spaced from the rod 112. The resultant space S between the upper edge 115 of each flap and the bottom of the tray thereabove, or in the case of the first tray, the bottom of the top plate 78, permits flow of cold air over each tray in metered amounts.

The space S is of predetermined size and approximately of the dimension shown in Figure 4. Its purpose is to permit a measured amount of cold air to flow into each of the trays and over the tops of the frozen cartons which are retained thereby. This direction of flow is indicated in Figure 3. It is quite evident that if the slot or space S is too large, there will be an undue amount of cold air discharged through each of the trays, resulting in loss of refrigeration in the interior of the cabinet; it is equally apparent that if the space S be too small, the amount of refrigerated air passing over the tops of the frozen packages will be insufficient to maintain the required low temperature of same. Accordingly, this space, if of the size approximating that shown in Figure 4, will be sufficient to serve the purposes desired—just enough flow of refrigerated air to maintain the proper temperature of the packages in the respective tray without overflowing such an amount as to overburden the refrigerating apparatus employed in conjunction with the cabinet. Those skilled in the art will appreciate this factor and can adequately estimate or determine the size of the space S to achieve the desired objectives. Furthermore, it is possible by well-known methods to construct the flaps 110 in such manner as to enable manual adjustment of the size of this space. In any event, it thus appears that such construction enables control of the amount of flow of cold air. Furthermore, the flaps 110 are pivoted in the described manner to conveniently permit loading of each of the trays with additional frozen packages as the supply is diminished.

In conjunction with the scoop or tray construction 35 which has been described in the foregoing, I have found it advisable to position a cover 111 above each of the trays, this cover extending outwardly with reference to the cabinet and having a downwardly turned lip 112. The cover provides support for illumination, such as fluorescent lights 113, but, more important, aids in reducing air circulation within the room for purposes which will presently appear. This cover 111 also provides support for a spool 114 upon which may be mounted the usual type of curtain indicated in dotted line in Figure 3. The latter may have a catch or similar device provided on the trough 35, and indicated at 116, for retaining this curtain in the position shown in dotted line in Figure 3.

In the operation of this refrigeration unit, there is a minimum of loss of cool air because of the cooperation of the several described elements to pick-up the relatively small amount of refrigerated air passing over the display trays and force it back into the interior of the showcase. This can be readily appreciated from observation of Figure 3 where it is seen that cool air, as indicated by the arrows, upon leaving the refrigeration piping 60 tends to flow downwardly and toward the front of the cabinet. After passing through the spaces S in each of the flaps 110 and over the frozen packages upon each of the inclined shelves or trays, this cold air will have a natural tendency to seek the floor level, its specific gravity naturally being greater than that of the warmer air of the room. With a constant circulation of the air obtained by the fan or blower 40, this cooler air which has reached the exterior of the cabinet will immediately be sucked into the horizontal flues along the bottom of the unit. As indicated hereinbefore, its course is then through the vertical flues 18, through the blower, over the refrigerating area, downwardly to the storage area and also laterally and downwardly toward the several dispensing shelves.

There is thus a constant circular flow, not only through the interior of the cabinet but also along the exterior face thereof of the display portion or along the extremities of the several display trays. It will then become obvious that, in essence, the entire structure involves a closed system where such cold air as may be warmed by slight contact with air at room temperature is immediately fed back into the cooling area for reduction in temperature to a predetermined standard. Such a concept of circulation, which may be considered closed circulation in all its practical aspects, is bound to result in dehydration of the cold air and maintenance of the humidity thereof at a low, far less than that of the air of the room wherein the cabinet is placed. This factor also materially contributes to elimination of the frost problem.

The curtain 115 is useful in preventing undue air circulation along the front of the unit when it is not in use. At the close of the day, positioning of the curtain in the manner indicated in dotted line in Figure 3 and locking it in such position by the lock 116 upon the trough 35 cuts down upon intermingling of room air with the refrigerated air that seeps out between the packages of the several trays and the space immediately above such packages. It is also to be understood that the base 4 of the unit can be raised substantially above room level, the description of the invention herein given being for purposes of illustration only. Raising of such base will naturally increase the height of the several trays above the floor and perhaps be of greater convenience to the customer in the selection of the desired frozen foods. Such raising of the base would have no effect upon the circulation of the cold air through the bottom horizontal flues and upwardly to the refrigeration unit in the manner already described.

It is also preferred that additional means be provided to prevent undue circulation and admixture of air at room temperature without intermingling of air descending along the forward wall of the unit. This means takes a form of a series of glass panels 135 or plastic plates which are positioned vertically in between each of the sectional units, when several are placed together. In the use of a single unit, such a vertical glass plate could be positioned on each end. At any rate, and as particularly shown in Figure 1, these glass plates 135 extend right-angularly to the cabinet and outwardly almost to the extent of the vertical line made by the curtain 115 and are positioned immediately underneath the hood or lid 111. They also extend downwardly to intercept the base 32 and upward flange 35 interconnected with this base. These partial closures obviously will not interfere with access to the cabinet nor a visual inspection of the contents thereof; they will, however, substantially reduce air fluctuations across the face of the unit, particularly drafts of air which otherwise might be caused to become admixed with the cold air due to any turbulence, such as caused by the passing of customers in front of the unit.

Figure 3 indicates the comparative size of the preferred embodiment of the invention. The interior portion of the cabinet should be of such height with respect to the plate 50 above the floor as to afford standing room, thereby permitting convenient loading of the several trays directly from the storage compartment. I have found it advisable to also provide a sliding ladder 120 which may be reciprocated along the floor of the cabinet upon a carrier wheel 121 affixed to the lower end of the ladder in a well-known manner. The upper end of the ladder is provided with a grooved pulley 125 and this rides upon a track or angle iron 128 which has a lower depending bracket 130. The latter may be affixed to the interior of the cabinet structure in any suitable manner. Access to the inside of the structure is obtained by the usual door 132.

While the invention has been described with reference to one embodiment only, it will be apparent to those skilled in the art that numerous changes and modifications may be made without departing from the principle thereof or from the essential features of the combination disclosed. Accordingly, the scope of the invention is to be limited only to the degree indicated in the appended claims.

I claim:

1. In an upright refrigerated display and dispensing cabinet, a series of angularly inclined package receiving trays along the front thereof, flap means at the rear of each of said trays permitting loading thereof, said flap means having an opening thereon for the admission of a predetermined quantity of refrigerated air, horizontal air receiving means beneath said trays, a cooling means in said cabinet, and flue means to direct air from said air receiving means to said cooling means and thence to said openings.

2. In an upright refrigerated display and dispensing cabinet, a series of package receiving trays angularly inclined downwardly from rear to front with respect to said cabinet, pivoted closure means at the rear of each of said trays permitting loading thereof, said closure means being provided with a space for the admission of a predetermined quantity of refrigerated air, horizontal air receiving means beneath said trays, a cooling means in said cabinet, and flue means to direct air from said air receiving means to said cooling means and thence to said spaces.

3. In an upright refrigerated display and dispensing cabinet, a series of package receiving trays inclined downwardly from rear to front with respect to said cabinet, pivoted closure means having a portion thereof of reduced dimension providing an air transfer opening, said closure means being positioned at the rear of each of said trays permitting loading thereof, air receiving means along the base of said cabinet and underneath said trays, a cooling means in said cabinet, a storage area in said cabinet, and flue means to direct air from said air receiving means to said cooling means, said storage area, and said air transfer openings.

4. In an upright refrigerated showcase and dispensing cabinet for frozen food packages, cooling means in the upper portion of the cabinet for maintaining the interior thereof at a predetermined, low temperature and for passing measured amounts of cooled air over said packages, said means comprising angular shelves in the front of said cabinet, said shelves providing communication from the interior of the cabinet to the exterior thereof, each of said shelves being inclined downwardly from back to front of said cabinet and having a package retaining flange on the lower end thereof, pivoted closure means on the upper ends of said shelves, each of said closure means having passageways for the transfer of cold air in measured amounts over said packages, a transverse air scoop across the front of said cabinet and below the lowermost of said shelves, upright flue means in interconnection with said scoop, a blower directed across said cooling means, said flue means opening into said blower, whereby the blower creates suction in said scoop and directs flow of air therefrom to said cooling means and thence through said passageways.

5. In a display refrigerator cabinet, an air refrigeration unit in association therewith, package receiving rack means comprising a plural series of trays on one side of said cabinet, cold air passageways between adjacent series of said trays, said passageways interconnecting the interior of said cabinet with the exterior thereof, air circulation means in said cabinet in interconnection with said unit, flue means having an inlet under said rack means in interconnection with said air circulation means, said air circulation means directing refrigerated air into said passageways and into said inlet, said passageways being provided with pivoted closure means at the inner ends thereof whereby only metered amounts of refrigerated air is permitted to travel said passageways.

6. In an upright refrigerated showcase and dispensing cabinet for frozen food packages, a series of trays to receive said packages, cooling means for maintaining the interior of said showcase at a predetermined, low temperature, means for passing cooled air over and in direct contact with the upper surfaces of said packages, a closure means on the rear of each of said series of trays, said closure means being provided with means to meter a predetermined quantity of said air over said packages, at least one transverse air scoop across the front of said cabinet adapted to capture refrigerated air falling down from said series of trays, flue means in interconnection with said scoop, and a blower in interconnection with said flue means adapted to recirculate said captured air and to direct said air across said cooling means.

7. In an upright refrigerated showcase and dispensing cabinet for frozen food packages, a series of trays to receive said packages, cooling means for maintaining the interior of said showcase at a predetermined, low temperature, means for passing cooled air over said trays and in direct contact with at least one surface of said packages, means to permit loading of said trays from the inside of said cabinet, said last named means including a pivoted closure means on the rear of each of said series of trays, said closure means being provided with means to meter a predetermined quantity of said air over said packages, at least one transverse air scoop across the front of said cabinet adapted to capture refrigerated air falling down from said series of trays, flue means in interconnection with said scoop, and a blower in interconnection with said flue means adapted to recirculate said captured air and to direct said air across said cooling means.

References Cited in the file of this patent

UNITED STATES PATENTS

| | | |
|---|---|---|
| 2,476,491 | Henderson | July 19, 1949 |
| 2,499,088 | Brill | Feb. 28, 1950 |